Feb. 26, 1924.

M. M. GUHIN 1,484,883

EDUCATIONAL DEVICE

Filed May 26, 1922          2 Sheets-Sheet 1

Inventor
M. M. Guhin.

Feb. 26, 1924.

M. M. GUHIN

EDUCATIONAL DEVICE

Filed May 26, 1922 2 Sheets-Sheet 2

1,484,883

Inventor
M. M. Guhin.
By Jno. Thomas Taylor
Attorney

Patented Feb. 26, 1924.

1,484,883

UNITED STATES PATENT OFFICE.

MICHAEL M. GUHIN, OF PIERRE, SOUTH DAKOTA.

EDUCATIONAL DEVICE.

Application filed May 26, 1922. Serial No. 563,783.

*To all whom it may concern:*

Be it known that I, MICHAEL M. GUHIN, a citizen of the United States of America, residing at Pierre, in the county of Hughes and State of South Dakota, have invented certain new and useful Improvements in Educational Devices, of which the following is a specification.

The invention relates to an educational device designed particularly for instructional service in elementary schools, for teaching certain facts, processes, and principles.

The improved educational appliance includes as a material part thereof a set of cards, on which the particular data or information to be imparted, taught, or indicated, to the pupil, is inscribed. These cards are arranged to be supported upon a rod, adapted thru suitable mechanism to be regularly and uniformly moved in a direction to cause the outermost or exposed card to drop from its position to expose the next card. As the apparatus for controlling the movement of the rod may be set for practically any speed, it is apparent that the cards are successively dropped at regular periods or intervals. Thus a card, presenting for example, a sum in addition as five plus two, will be exposed to the pupil for a certain definite time, say three seconds, during which time the child is supposed to grasp the problem, mentally solve the same, and announce the answer. The successive cards will thus be exposed, each for a period of three seconds, or any other time period for which the apparatus may be regulated and the child is supposed to be thus taught to solve the presented problem or answer the presented question.

The invention is illustrated in the accompanying drawings, in which.

Figure 1:
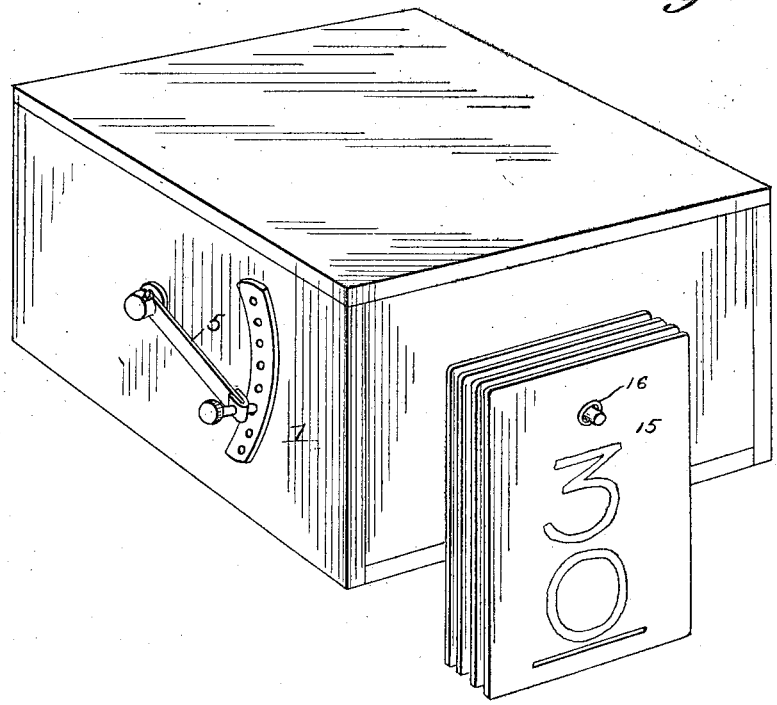
Fig. 1 is a perspective view of the case and cards in position, the top being removed.
Figure 3:
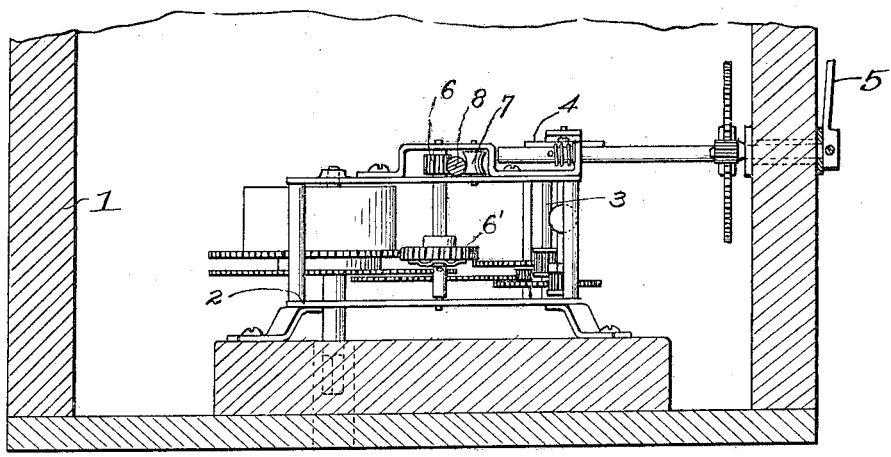
Fig. 3 is a section on line 3—3 of Fig. 2.
Figure 2:
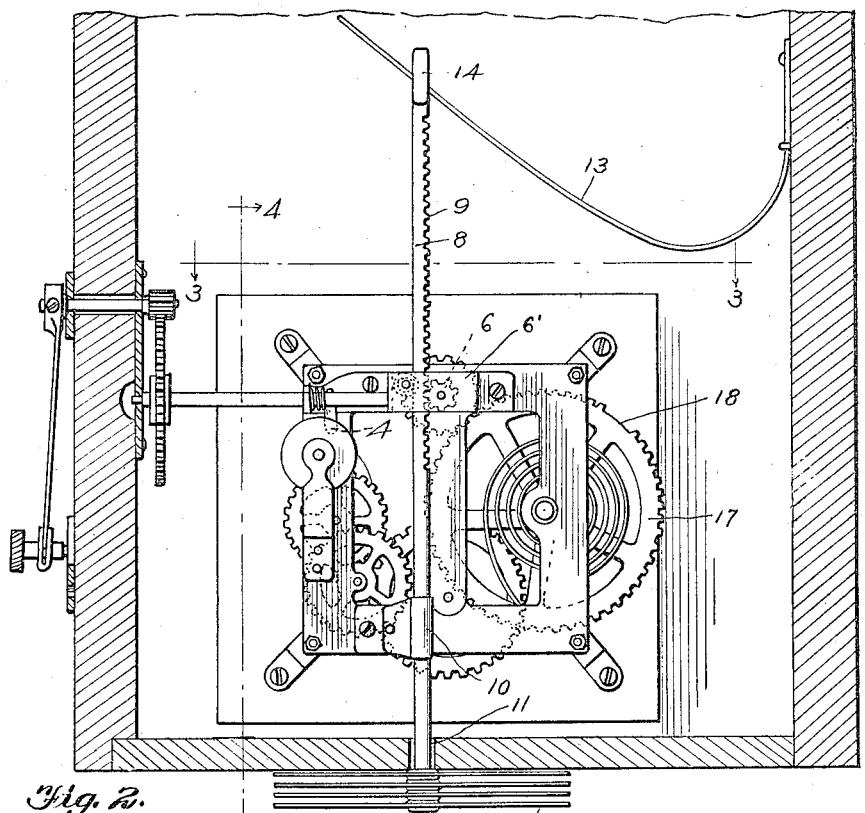
Fig. 2 is a plan view of the mechanism with the casing in section.
Figure 4:
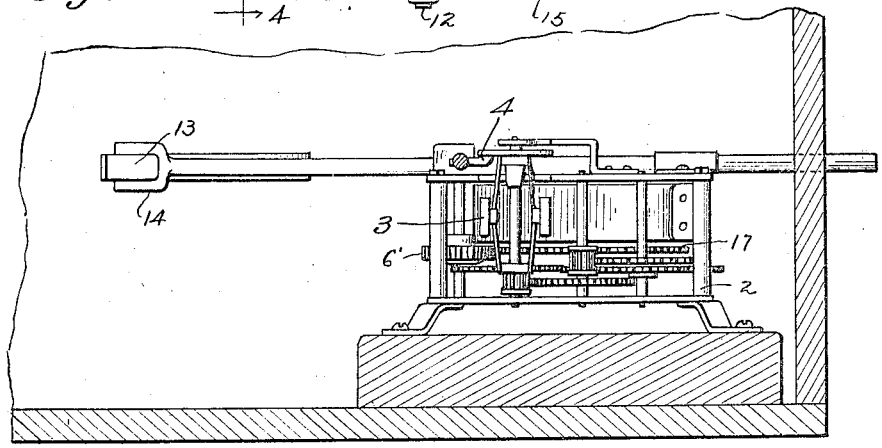
Fig. 4 is a section on line 4—4 of Fig. 2.

The educational appliance, comprises a casing 1 of appropriate size, within which is arranged a suitable type of motor mechanism 2. This mechanism is here shown as of the spring clock type, but it is to be understood that this illustration is merely a convenient showing, as any type of motor mechanism of well known and ordinary usage, such for example as an electric motor or the like, may be employed. This motor mechanism, as here shown includes a governor 3, and a brake 4, controlled from outside the case thru a handle 5, whereby any desired speed, within the range of the motor, may be continuously produced. The motor mechanism, of whatever type employed, operates a gear pinion 6, adjacent which is mounted an idler-grooved roller 7. A card rod 8 is arranged between the pinion and idler, said rod being formed with teeth 9 to be engaged by the pinion, with this tooth engagement maintained by the bearing between the rod and idler 7. Beyond the pinion 6, the card rod passes thru a guide 10, with the result that in the operation of the motor mechanism, the card rod 8 is moved along a predetermined line, and at a rate of speed controlled by the brake 4. The card rod projects thru an opening 11, in what may be termed the forward wall of the casing, and the gear pinion 6 is so mounted on its shaft that the card rod may be projected manually any desired distance thru the opening 11 and beyond the forward wall of the case, the movement of the pinion in the opposite direction, in the operation of the power mechanism, serving to move the rod inwardly, that is, cause its free end 12 to approach the forward wall of the case. A spring 13 is secured to one wall of the casing, and bears loosely in the forked end 14 of the card rod, this spring resisting the feeding movement of the rod under the motor mechanism in order to maintain a steady uniform movement of said rod, as will be obvious.

Cards 15 formed with suitably protected openings 16, to loosely receive the card rod 8, form an essential part of the appliance. These cards bearing on one or both faces any desired data, for the use of the pupil, such as simple mathematical problems, historical facts, grammatical tests, or the like, are supported in successive relation on that portion of the card rod 8 projecting beyond the forward wall of the casing. The motor mechanism set for a predetermined speed of movement, will draw the card rod inwardly, and thus successively and uniformly drop the cards, as the end of the rod rides free of such cards.

There will thus be presented to the eye of the pupil, the data of the successive cards, which data will remain visualized for a predetermined period, during which it is intended that the pupil or pupils shall perform the operation indicated by the test card presented.

Of course these tests may be of any character, for example, sums in addition, subtraction, or multiplication; important historical facts requiring answer; sentences to be properly completed; or the like. It is the important function of the educational appliance as a whole to teach the pupil to quickly answer questions or give mathematical results since the cards are successively presented at such regular intervals as will prevent the ordinary mind from having time to work out an answer, even mentally.

The cards, which will be hereinafter termed flash cards, owing to their obvious flashing before the pupil, may be made up, of course, for any character of tests, whether elemental or not, and may thus serve a great variety of purposes. Thus the cards may be of any size and may contain any kind of data.

The educational appliance is of particular advantage in teaching children, and its use of unusual importance in rural schools where the teacher has under instruction a number of classes of pupils of different degrees of advancement. The device may, under these conditions, be advantageously in use with pupils of one class, while the teacher is occupied with pupils of another class.

If, as is contemplated, the motor mechanism 2 be of the spring clock type shown, the main spring-operated gear 17, by which the pinion 6 and therefore the rod 8 is actuated thru pinion 6', may be mutilated as indicated at 18, so that when this mutilated portion registers with the gear pinion 6', said pinion will be free and the rod 8 will be then projected to its limit of movement by the spring 13.

Thus, the device may be made automatic in that the mutilated portion of the gear 17 may be so aranged that when the free end of the rod registers with the card stop formed in this instance by the forward wall of the casing, said mutilated portion will free the pinion 6 and the rod 8 will be correspondingly projected to receive another set of cards.

Having thus described the invention, what is claimed as new, is:—

1. An educational appliance having a card-rod to loosely receive a series of cards, and means to force said cards successively and at regular time intervals from said rod.

2. An educational appliance including a series of cards, means for suspending the cards in superimposed relation, and means to displace the cards in succession and at regular time intervals through movement of the suspending means.

3. An educational appliance including a series of cards, means for suspending the cards in superimposed relation, and means to displace the cards at regular successive time intervals through moving the suspending means relative to these series of cards.

4. An educational appliance including a card-supporting means, a series of cards supported thereon to expose the first card of the series, and means for moving the supporting means relative to the entire series of cards to withdraw said supporting means in succession from the respective cards, whereby to expose the cards in succession and at regular time intervals.

5. An educational appliance including a card-supporting rod, a series of cards supported thereon to expose the first card of the series, and means for continuously and uniformly operating the supporting rod to expose the remaining cards in succession and at regular time intervals.

6. An educational appliance including a card-supporting means, a series of cards supported solely thereon to expose the first card of the series, means for operating the supporting means to expose the remaining cards in succession and at regular intervals, and means for controlling the operating means to vary the intervals at will.

7. An educational appliance including a casing, a card rod movable to one part of the casing serving as a stop, cards slidably held on said rod against said stop, and means for imparting movement to said rod to successively displace said cards relative to the rod.

8. An educational appliance including a card rod, a card stop through which said rod is movable, a series of cards suspended on said rod to expose the first card of such series, and means for moving the rod at a predetermined rate to successively displace the cards of the series at uniform intervals, whereby to successively display the cards of the series for similar intervals.

9. An educational appliance including a card stop, a card rod movable through said stop, motor mechanism for operating the card rod relative to the stop, and a series of cards formed with openings to permit said cards to be suspended on the rod beyond the stop in superimposed relation, said rod in the operation of the motor mechanism displacing the cards in succession.

10. An educational appliance including a casing, a card rod movable with relation to one part of the casing serving as a card stop, means for imparting movement to said rod in one direction, and means for automatically imparted movement to the rod in the opposite direction, said latter means being released for operation in a predetermined position of the card rod with relation to the stop.

In testimony whereof I affix my signature.

[L. S.]     MICHAEL M. GUHIN.